Jan. 20, 1925.
O. B. SNYDER
GRASS TRIMMER
Filed Nov. 11, 1922
1,523,729
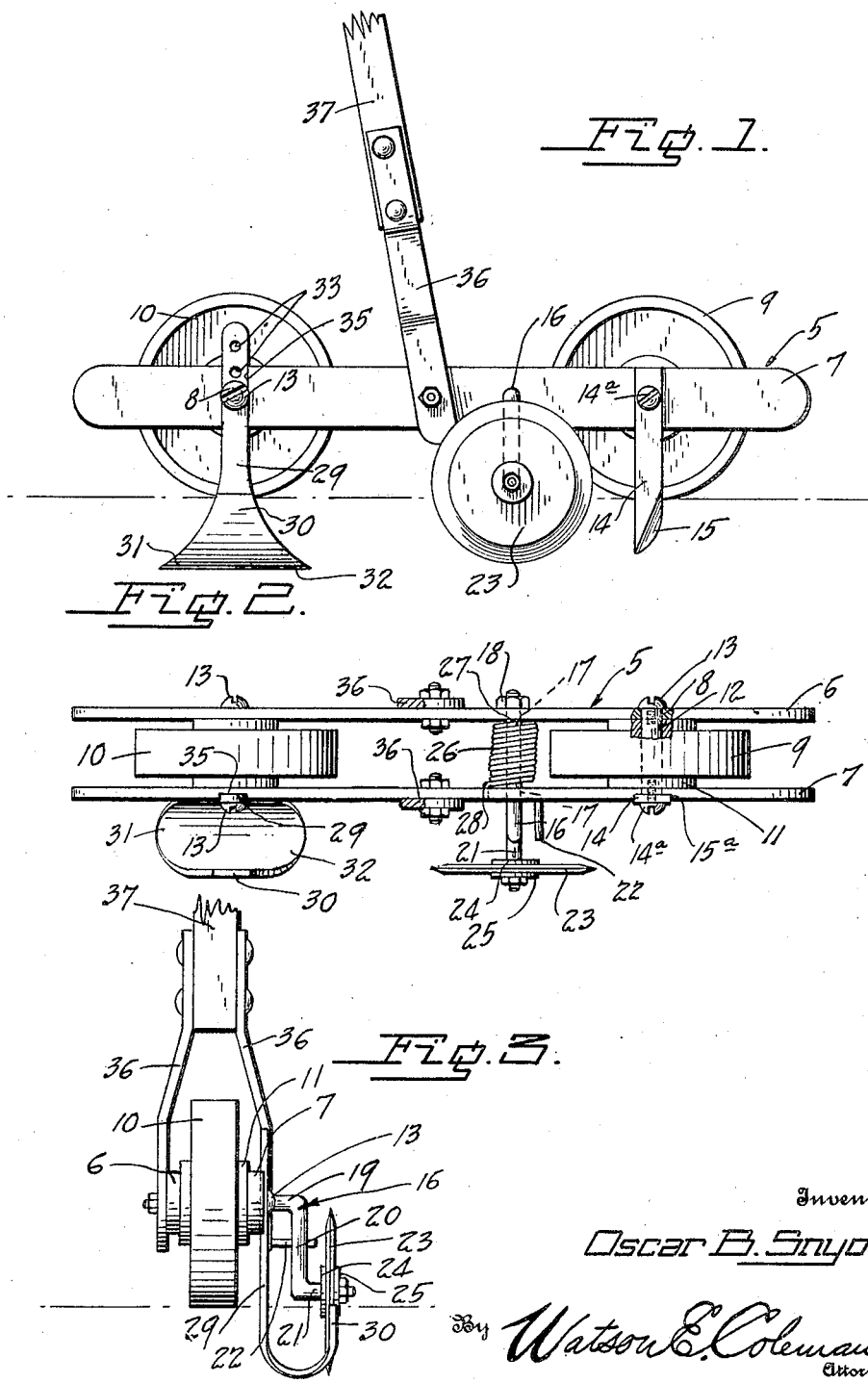

Patented Jan. 20, 1925.

1,523,729

UNITED STATES PATENT OFFICE.

OSCAR B. SNYDER, OF MUNCIE, INDIANA.

GRASS TRIMMER.

Application filed November 11, 1922. Serial No. 600,310.

*To all whom it may concern:*

Be it known that I, OSCAR B. SNYDER, a citizen of the United States, residing at Muncie, in the county of Delaware and State of Indiana, have invented certain new and useful Improvements in Grass Trimmers, of which the following is a specification, reference being had to the accompanying drawings.

This invention relates to grass trimmers and has for its object to provide a grass trimmer capable of use for efficient trimming of the edges of a lawn or terrace without unnecessary strain on the part of the operator and with a saving of time and labor.

It is another object of the invention to provide a device of this character wherein the desired marginal strip may be provided adjacent the walk without requiring a double cutting operation and without requiring the portion cut to be dug or removed from the space between the lawn and the walk after the cutting operation by separate means.

It is also an object of the invention to provide a device of this character wherein the desired strip to be removed may be cut simultaneously at spaced points and the matter removed from the space by means carried by the device without requiring the implement to be passed a second time over the same ground and wherein this matter may be removed by movement of the device in either direction.

It is still a further object of the invention to provide a device of this character which is compact in form so that it can be used in a small space, without interfering with the operation of the cutters.

With these and other objects in view, the invention consists in the improved construction and arrangement of parts to be hereinafter more particularly described, fully claimed and illustrated in the accompanying drawings, in which:—

Figure 1 is a side elevation of a grass trimmer constructed in accordance with an embodiment of the invention;

Figure 2 is a top plan view, the handle portion being shown in section; and

Figure 3 is an end elevation of the structure shown in Figure 1.

Referring to the drawings, 5 designates the body member of the device, said body member comprising elongated strips 6 and 7 having openings 8 in their end portions. Disposed between each end portion of the strips 6 and 7 are wheels 9 and 10, each wheel including a hub portion 11 which projects beyond the wheel structure to space the peripheral edges of the wheels from the strips. Extending through each of the hub members 11 is a shaft 12, having openings in its end portion for the reception of machine screws 13 by means of which the shaft is secured between the strips 6 and 7 and adapted to rotatably support the wheel.

In connection with the body member 5, an inner cutter 14 is provided, said cutter consisting of a blade having its lower forward end portion 15 beveled and rounded so as to readily enter the ground. This blade is disposed in the groove 15ª provided in the outer face of the strip 7 adjacent the screw 14ª of the shaft 12, said screw being used to hold the blade within the groove.

By the use of the groove and the screw the blade is held at all times at right angles to the lower edge of the strip 7 so as to readily enter the ground without possibility of oscillating movement of the cutter. This cutter is intended to cut inwardly of the edge of the lawn, or in other words, at a point spaced from the edge of the walk or wall.

In connection with the rigid inner cutter 14 there is provided a movable outer cutter mechanism comprising a shaft 16 adapted to extend through registering openings 17 provided in the strips 6 and 7 rearwardly of the front wheel 9. One end of the shaft is threaded for the reception of a nut 18 by means of which the shaft is secured to the strip. The opposite end portion 19 of the shaft extends beyond the strip 7 and is then extended downwardly as at 20 and has its extremity extended outwardly to provide a stub shaft 21, the extremity of the stub shaft being reduced to provide a shoulder.

Projecting from the side member 7 adjacent the shaft 16 is a stop member 22 adapted to limit forward movement of the portion 20 of the shaft.

Mounted on the reduced end portion of the stub shaft is an outer disc cutter 23, washers 24 and 25 being engaged with the sides of the cutter to permit unrestricted rotary movement of the cutter. By means of the nut 18 and portion 20 the shaft 16 is limited in its lateral movement with respect to the strips 6 and 7. At the same time it is desirable that the shaft oscillate. To permit this, a coil spring 26 is provided. The end portion 27 of the spring is secured to the shaft adjacent the threaded end of the shaft, while the end portion 28 is secured in an opening provided in the strip 7. By this means it is possible not only for the disc 23 to rotate on the stub shaft, but is also possible for the shaft to oscillate to permit adjustment of the cutter according to the formation of the lawn, thus assuring a cut of the proper depth.

By the use of the inner and outer cutters it will be noted that two parallel cuts are made, the space between the cuts corresponding to the width of the margin desired at the edge of the lawn. In order to remove the grass and dirt disposed between the cuts there is provided a novel plow or cutting scoop comprising a shank 29. The end portion 30 of the shank is enlarged and provided with extensions 31 and 32, said extensions having their edges rounded and sharpened to serve as cutters. In the formation of the plow or cutting scoop the end portion 30 is curved back upon the shank 29 to provide a double edged scoop or plow, the scoop or plow being so formed that the cutting edges of the extensions 31 and 32 serve the purpose of a plow to extend beneath the turf and remove the matter disposed between the cuts made by the cutters 14 and 23. The opposite end portion of the shank 29 is provided with a plurality of openings 33. The shank 29 of the plow is intended to be mounted in a groove 35 provided by the strip 7, said groove being disposed adjacent the opening of the screw 13. The shank 29 of the plow is adapted to be disposed in the groove 35 and to be secured to the side member by means of the screw 13 which serves to hold the shaft of the wheel 10 to the strip 7. By the provision of the groove 35 the shank 29 of the plow is properly held and prevented from horizontal movement, the screw serving to urge the shank into the groove. In view of the fact that a plurality of openings 33 are provided, it is possible to adjust the shank of the plow according to the amount of matter desired to be removed from between the cuts. Extending from the central portion of each of the strips 6 and 7 are arms 36, said arms being bolted to the strips, the upper ends of the arms being provided with openings for the reception of bolts, by means of which a handle 37 may be secured to the arms. This handle may be of any desired construction.

In the use of the device the body member is positioned so that the outer cutter 23 will cut the portion of the lawn touching the walk or wall while the cutter 14 will cut the strip outwardly of the walk, thus leaving a narrow strip of grass and dirt between the cutters. As the machine travels on the cutting scoop which is substantially disposed between the cutters will plow the grass and dirt from the space between the cuts, the dirt passing through the scoop and out at the opposite end. The extension 31 of the plow or scoop 30 permits the device to be moved backward after plowing matter, for instance, in a corner. The movable shaft 16, through the medium of the spring, permits the cutter 23 to adjust itself, the spring always urging the cutter forwardly or away from the plow or scoop.

From the foregoing it will be readily seen that this invention provides a novel grass trimmer for lawns capable of performing three operations at once, namely, the cutting of the inner and outer edges of a margin and the plowing of the turf between the cuts of the margin so that all that is necessary is to remove the matter left by the plow. In addition to this, it permits an even margin of a uniform depth to be cut along all the edges of the lawn. All of these features are possessed by a device which is compact in form and composed of only a few simple parts.

What is claimed is:—

1. A grass trimmer comprising a frame including spaced longitudinal bars, a pair of wheels journaled between said bars, a handle structure connected with the frame, a blade secured to and depending from one bar and constituting an inner cutter, a disk journally supported from the frame and projecting beyond said blade to define an outer cutter, and a U-shaped plow carried by the frame and having its opposite side edges alining substantially with said blade and disk respectively.

2. A grass trimmer comprising a wheel supported frame, a rigid depending blade carried by the frame and constituting an inner cutter, a crank shaft journaled through the frame and carrying a disk spaced outwardly beyond said blade and defining an outer cutter, spring means normally holding said crank shaft in one position while permitting yielding thereof, and a plow carried by the frame rearwardly of the crank shaft and having its edges alining substantially with the cutter and disk respectively.

3. A grass trimmer comprising a wheel supported body member, an inner rigid cutter carried by one side portion of the body member, an oscillating shaft carried by the body member and projecting beyond said side of the body member, cutting means carried by the projecting end of the shaft, said cutting means being disposed in spaced parallel relation to the rigid cutter, a plow member including a shank, adjustably secured to said side of the body member and adapted to plow matter between the cuts made by the inner and outer cutting means, and a spring urging said oscillating shaft away from the plow.

4. A grass trimmer comprising a wheel supported body member, a rigid cutting member carried by one side face of the body member, a shaft mounted in the body member for oscillating movement, one end of the shaft projecting beyond said side face of the body member and being formed into a crank, a movable cutter carried by the crank in spaced relation to said side face of the cutter member, and a double edged plow member secured to said side face adjacent the movable cutter.

5. A grass trimmer comprising a wheel supported body member, a rigid cutting member carried by one side face of the body member, a shaft mounted in the body member for oscillating movement, one end of the shaft projecting beyond said side face of the body member and being formed into a crank, a movable cutter carried by the crank in spaced relation to said side face of the cutter member, a double edged plow member secured to said side face adjacent the movable cutter, and means connected to the shaft and the body member for urging the movable cutter away from the plow member.

In testimony whereof I hereunto affix my signature.

OSCAR B. SNYDER.